United States Patent [19]

DiMatteo

[11] 4,448,505
[45] May 15, 1984

[54] ARRANGEMENT FOR ADDRESSING RAYS OR PLANES OF LIGHT IN SPACE

[75] Inventor: Paul DiMatteo, Huntington, N.Y.

[73] Assignee: Robotic Vision Systems, Inc., Hauppauge, N.Y.

[21] Appl. No.: 423,197

[22] Filed: Sep. 24, 1982

[51] Int. Cl.³ .................. G03B 21/02; G01B 11/24
[52] U.S. Cl. .................................... 353/122; 353/38; 353/94
[58] Field of Search .................. 353/122, 85, 88, 20, 353/98, 102, 94, 34, 36, 38, 28; 350/358, 371, 388, 390, 247; 362/210, 212, 211; 355/8, 70, 69

[56] References Cited

U.S. PATENT DOCUMENTS

| | | | |
|---|---|---|---|
| 1,213,974 | 1/1917 | Taylor | 353/98 |
| 3,614,200 | 10/1971 | Taylor | 350/371 X |
| 3,877,801 | 4/1975 | MacGovern | 353/122 X |
| 3,890,035 | 6/1975 | Takeda | 350/388 |
| 4,162,121 | 7/1979 | Starkweather | 350/358 |
| 4,182,553 | 1/1980 | Sheridon | 350/371 X |
| 4,187,011 | 2/1980 | DiMatteo et al. | 353/30 X |
| 4,222,641 | 9/1980 | Stolov | 353/122 X |

OTHER PUBLICATIONS

Blumich, B. P. and R. Germer, "Electro-Optic Shutters with PLZT Ceramics for Infrared Applications".
J. Phys. E: Sci. Instrum., vol. 12, No. 8, Aug. 1979, pp. 767-774.

Primary Examiner—Harry N. Haroian
Attorney, Agent, or Firm—Max Fogiel

[57] ABSTRACT

Rays or planes of light in space are addressed, according to this invention, by purely electrical commands and without the need for mechanically moving parts.

7 Claims, 6 Drawing Figures

ARRANGEMENT FOR ADDRESSING RAYS OR PLANES OF LIGHT IN SPACE

BACKGROUND OF THE INVENTION

The present invention relates to addressing of rays or planes of light in space.

For certain applications, it is highly desirable to be able to direct or address rays or planes of light in space—i.e. issue commands which affect such rays or planes—using purely electrical command signals without requiring mechanically moving parts. It is of particular interest to be able to simultaneously address multiple planes in space. Heretofore, this has not been possible and the results have therefore often not been as satisfactory as desired.

SUMMARY OF THE INVENTION

Accordingly, it is an object of the present invention to provide improvements along the lines set forth above.

A more particular object is to provide an improved manner of addressing rays or planes of light in space, using purely electrical command signals without mechanically moving parts.

Another object is to provide an improved arrangement for this purpose.

Pursuant to these and still further objects, one feature of the invention resides in an arrangement for addressing rays or planes of light in space, comprising a plurality of addressable light sources; and means having an object plane at which the light sources are located, so that energization of each light source, singularly or several light sources simultaneously, will result in illumination of a corresponding image in the image of the means.

The present invention is particularly applicable to the arrangement in U.S. Pat. No. 4,187,011, in which a plurality of projectors with stationary masks are located about an object with surface to be geometrically analyzed. Each projector projects a light beam passing through a respective mask and applies a projected pattern onto the object, which subdivides the object into predetermined sections. For each mask that is applied, the projector illuminates preselected sections of the object. The illuminated and non-illuminated sections combine to form a predetermined pattern corresponding to the assigned code. The masks are illuminated in the projector in sequence, and produce a separate pattern of illumination on the object for each applied mask. The different patterns, when taken in combination, subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask is photographed by cooperating cameras which have the entire surface within their field of view. The photographs taken by the cameras are correlated to photographs taken similarly of a reference object to establish the spatial locations of points on the surface of the object.

The projectors spaced about the object with the surface to be analyzed, have cooperating masks so that the illuminated pattern from one projector cooperates correspondingly with the illuminated pattern of the remaining projectors. The plurality of projectors positioned about the object, serve to cover the entire surface of the object.

The invention will hereafter be described with reference to exemplary embodiments. It is to be understood, however, that this is by way of explanation only and is not to be considered limiting of the scope of the appended claims.

BRIEF DESCRIPTION OF PREFERRED EMBODIMENTS

Figure 1:
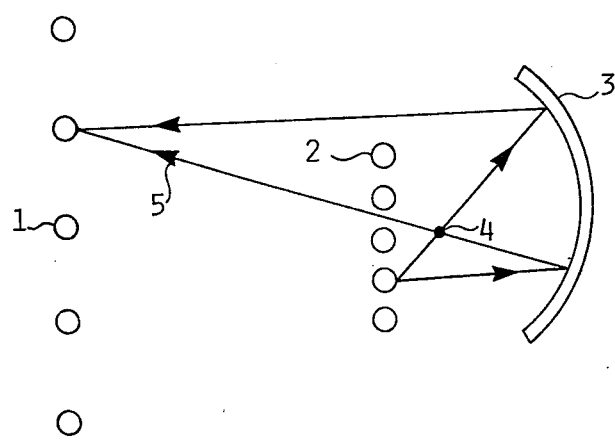
FIG. 1 is a diagrammatic side view of a novel arrangement.

FIG. 1 illustrates an embodiment in which a plurality of lamp images 1 in space are to be electrically addressed singularly or multiply; which is to say, they are to be illuminated or extinguished. For this purpose, the light sources or lamps 2 are separately addressable and so positioned as to be located adjacent a concave mirror 3 having the focal point 4.

When one of the lamps 2 lying in the object plane of the mirror is addressed, e.g. illuminated, a typical light-ray path will be as indicated by the arrows 5, illuminating (creating) an image of the lamp 2 at one of the locations 1 in space. Focal point 4 of the mirror is shown for reference.

This type of embodiment can be implemented, for low or moderate light power, with liquid crystals, PLZT light shutters and acoustic modulators for addressing beams with a single light source. The acoustic modulator requires a narrow wave-length columnated light source.

Figure 3:
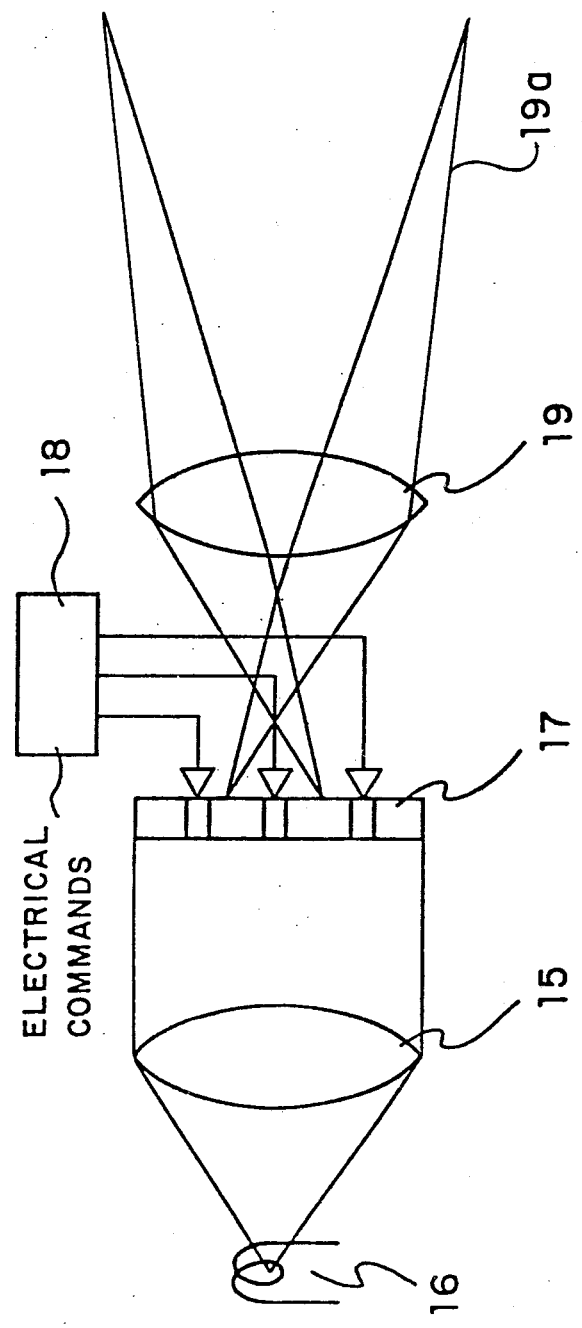
FIG. 3 is a schematic view of a PLZT or liquid crystal light gating properties arrangement.
Figure 4:
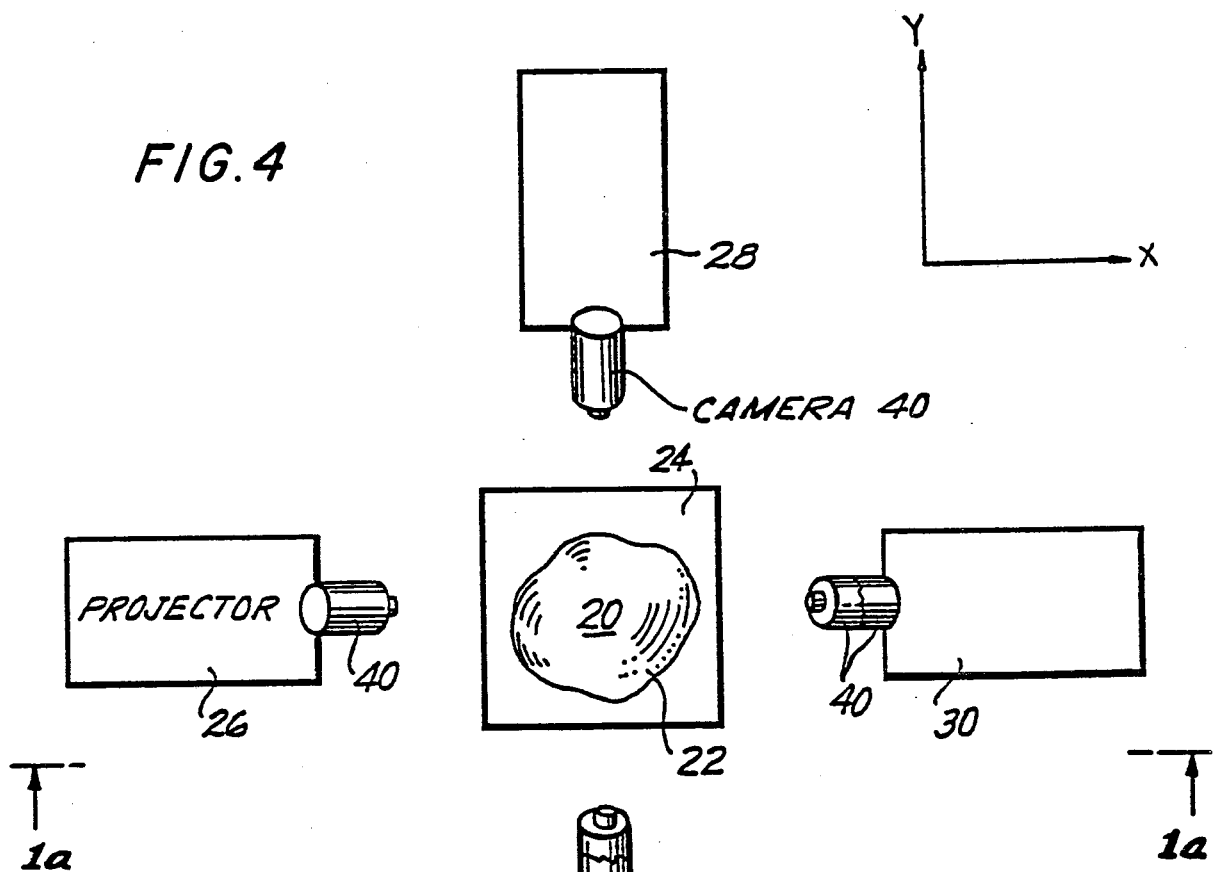
FIG. 4 is a schematic plan view and shows the relative arrangement of the surface to be analyzed or investigated, the projectors, and the cameras.
Figure 5:
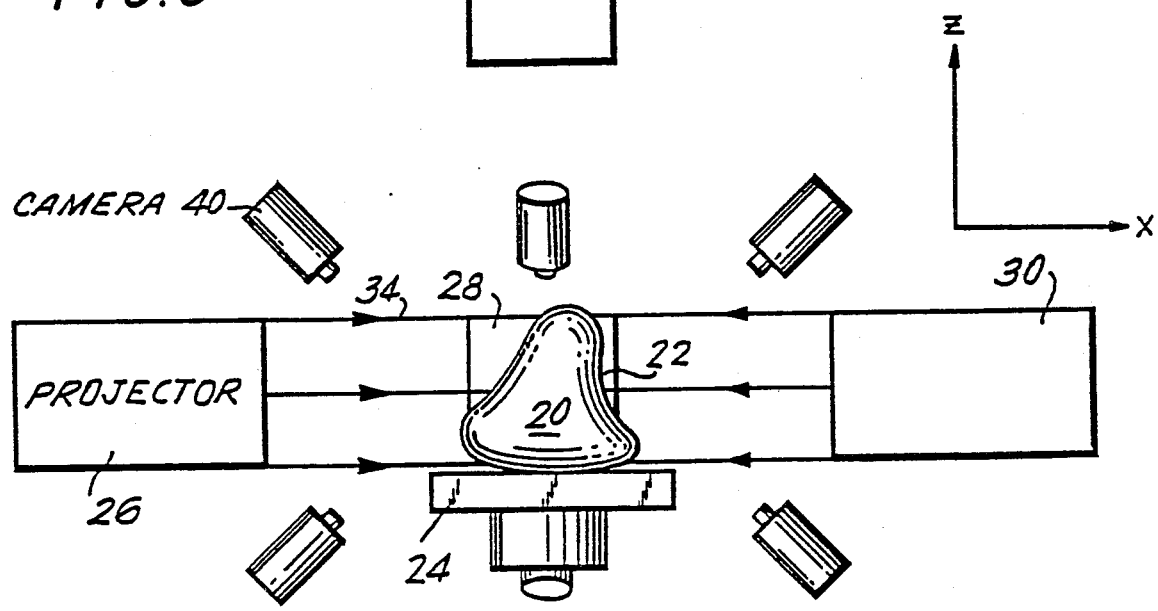
FIG. 5 is a schematic elevational view taken along line 1a–1a in FIG. 1.

Thus, referring to FIG. 3, a collimating or condensing lens 15 is located between a light source 16 and array unit 17 which can be PLZT or light crystal or other array with light gating properties. The unit 17 is addressed by electrical commands from a source 18 which may be in the form of simple switching circuit elements. The unit 17 may also be in the form of the aforementioned acoustic modulators. Lens 19 then provides the multiple or singular plane output 19a.

LED and solid state laser arrays are also commercially available at this time with 100 and more diodes. However, again these have a limited frequency band width and low to moderate power. To date, none of them have elements which are separately addressable.

Figure 2:
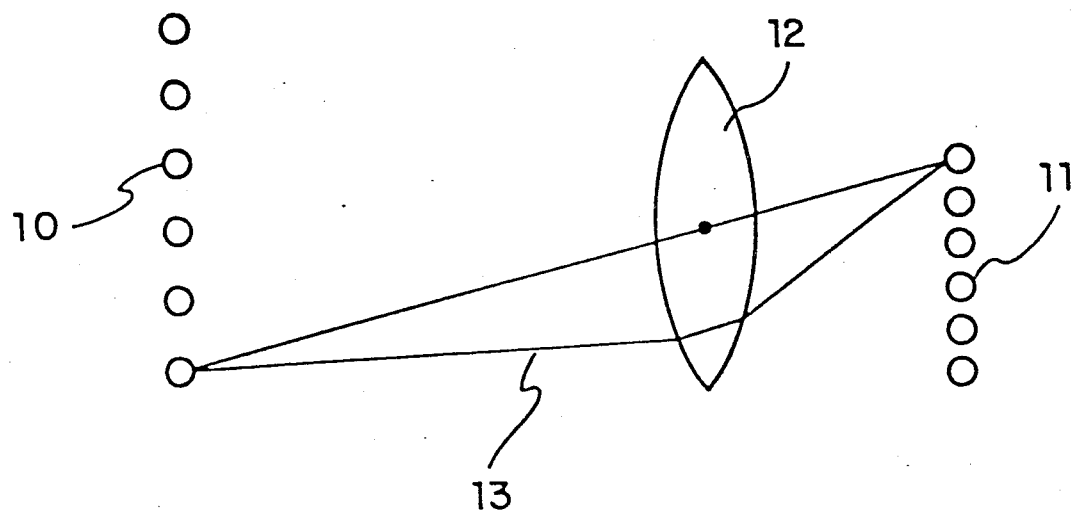
FIG. 2 is a view similar to FIG. 1, but of a different arrangement for the same purpose.

The embodiment in FIG. 2 makes use of separately addressable lamps 11 which allow each lamp image in space to also be separately or simultaneously addressed. They are placed in the object plane of a lens 12 so that each lamp, when actuated, illuminates an image in the image plane of the lens (i.e. in space), as indicated by the arrows 13. Light intensities of these configurations can be very bright and the embodiment allows the use of white light from flash lamps, arc lamps, incandescent lamps, and the like.

In applying the present invention to the arrangement of U.S. Pat. No. 4,187,011, a plurality of projectors 26, 28, 30, 32 are arranged with stationary masks 60 about the object 20 with the surface 22 to be geometrically analyzed. Each projector projects a light beam 34 passing through a respective mask and applies a projected pattern onto the object, which subdivides the object into predetermined sections. For each mask that is applied, the projector illuminates preselected sections of the object 20. The illuminated and non-illuminated sections combine to form a predetermined pattern corresponding to an assigned code. The masks are illuminated in the projector in sequence, and produce separate patterns of illumination on the object for each applied mask. The different patterns when taken in combination subdivide the object into a substantially large number of sections, in accordance with a predetermined digital code. The code is selected in accordance with the present invention so that a large number of subdivided sections are obtained for a relatively few number of masks or projected patterns on the object.

Each pattern of sections associated with a mask is photographed by cooperating cameras which have the entire surface within their field of view. The photographs taken by the cameras are correlated to photographs taken similarly of a reference object to establish the spatial locations of points on the surface of the object.

The projectors spaced about the object with the surface to be analyzed have cooperating masks so that the illuminated pattern from one projector cooperates correspondingly with the illuminated pattern of the remaining projectors. The plurality of projectors positiond about the object serve to cover the entire surface of the object.

Figure 6:
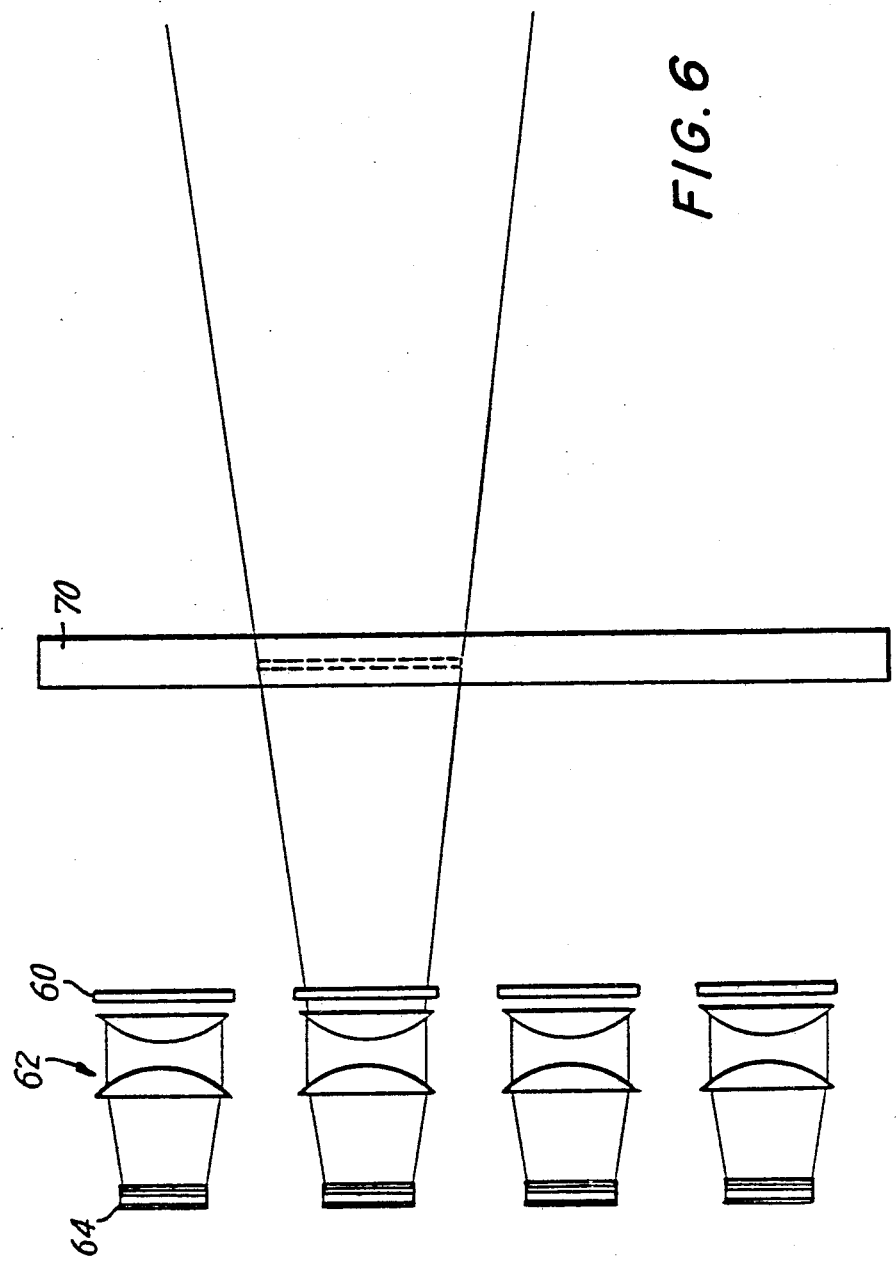
FIG. 6 is a schematic view and shows an arrangement in which a cylindrical projection lens is used in conjunction with a multiple number of illuminating sources.

In operation of the projectors and masks, a mask represented on a slide 60, for example, is held in front of a condensing lens 62, as shown in FIG. 6. In back of the condensing lens 62, is a source 64 which illuminates the slide 60 through the condensing lens. The light rays impinging on the surface 22 of the object 20 applies an illuminated coded pattern corresponding to the mask on the slide 60. To illuminate the surface 22 of the object with a sequence of coded patterns provided by separate masks, a plurality of such masks on slides 60, for example, can be positioned within the projector, in accordance with the arrangement of FIG. 6. In back of each slide 60, there are located a condensing lens 62 and a source 64. Separate condensing lenses and sources of light may be provided for each of the slides. Furthermore, each slide 60 has on it a separate coded pattern of parallel bands to be applied to the surface of the object. A cylindrical projection lens 70 is positioned in front of the slide 60, and has a height corresponding to the total height occupied by the combined slides. The cylindrical lens 70 serves to define sharply the border lines between bands.

The invention has been described with reference to exemplary embodiments. However, modifications thereof will offer themselves to those skilled in the art and are, therefore, intended to be included within the scope of the protection offered by the appended claims.

What is claimed is:

1. An arrangement for projecting a sequence of coded patterns onto an object surface, comprising: code generation means having a plurality of electrically addressable light attenuation regions with a single light source for irradiating said code generation means; each region of low attenuation resulting from addressing producing illumination of a corresponding part of said projected coded pattern; said coded pattern being projected onto the object surface by passing electromagnetic radiation through said code generation means.

2. Arrangement as defined in claim 1, wherein said first mentioned means comprises a PLZT shutter.

3. Arrangement as defined in claim 1, wherein said first mentioned means comprises a liquid crystal.

4. Arrangement as defined in claim 1, wherein said first mentioned means comprises an acoustic modulator.

5. Arrangement as defined in claim 1, wherein a predetermined number of said light attenuation regions are addressed simultaneously in a predetermined coded form.

6. Arrangement as defined in claim 1, wherein only a single light attenuation region is addressed at one time.

7. An arrangement for projecting a sequence of coded patterns onto an object surface, comprising: a plurality of stationary masks each carrying a predetermined coded pattern of at least one line for forming parallel bands to be projected in sequence, the coded pattern being projected onto the object surface by passing electromagnetic radiation through the mask; light attenuation means having a plurality of electrically addressable light attenuation regions with a single light source for irradiating said masks, each mask having a separate associated region; each region of low attenuation resulting from addressing producing illumination of a corresponding mask; coded patterns being selectively projected in sequence onto said object surface by selectively addressing in sequence said light attenuation region with electrical command signals.

* * * * *